United States Patent [19]

Vrbanek

[11] 4,375,349

[45] Mar. 1, 1983

[54] APPARATUS FOR SHAPING DOUGH

[76] Inventor: Branko Vrbanek, 8 Gailgrove Ct., Bramalea, Ontario, Canada, L6S 2E1

[21] Appl. No.: 333,460

[22] Filed: Dec. 22, 1981

[51] Int. Cl.³ ............................ A21C 9/00; B29D 7/14
[52] U.S. Cl. ................................ 425/324.1; 425/337; 425/366; 425/367; 425/374
[58] Field of Search ............... 425/363, 366, 367, 374, 425/324.1, 328, 335, 336, 337, 383, 393, 400

[56] References Cited

U.S. PATENT DOCUMENTS 3,018,425 2/1962 Smith ................................... 425/366
3,962,760 6/1976 Koss et al. ........................... 425/366

Primary Examiner—Willard E. Hoag
Attorney, Agent, or Firm—Donald E. Hewson

[57] ABSTRACT

Apparatus for shaping lumps of dough to flattened disks having substantially circular shape is provided. The apparatus comprises at least a first pair of rollers, generally two pairs of rollers, where flattening of the dough material begins, and a final pair of rollers where the dough material is flattened to its determined final thickness for baking. Between the final and next pair of rollers is a pair of conical rollers, gently urged towards each other, where the flattened dough material which emerges from the pair of rollers above the conical rollers is turned in a plane through an angle of about 60 to 90 degrees, so that the dough enters into the final pair of rollers with a different initial contact point than from the last pair of rollers. Generally, the dough material is elliptical when it is turned by the conical rollers, so that it becomes substantially circular after it emerges from the final rollers.

16 Claims, 3 Drawing Figures

APPARATUS FOR SHAPING DOUGH

FIELD OF THE INVENTION

This invention relates to apparatus for shaping lumps of dough, generally balls of dough, to become flattened disks each having substantially circular shape. In particular, the present invention relates to apparatus wherein lumps of dough are rolled and prepared to a shape suitable for baking, where the kind of dough being baked becomes bread of the sort generally popular among people from the Middle East, or for such other purposes as discussed hereafter.

BACKGROUND OF THE INVENTION

The production of bread and other pastries and dough-based products is a continuing, day-to-day operation. Many breads are, of course, baked in loaf tins or forms, but many other kinds of bread products—as well as other products—are baked flat on a tray or conveyor within an oven, without being confined within a form. Such bread types principally comprise bread which, when finally prepared and sold to the consumer, is quite flat and thin, very often comprising little more than an upper and lower crust. Such breads are particularly popular among people whose origin has been in the Middle East; and are widely produced not only in the Middle East, but in the North American and European markets as well.

In all such cases, it is desirable that the bread should have a substantially circular shape. This not only makes packaging more easy, but provides product that has broader acceptance by the consuming public.

Moreover, it is sometimes desirable to provide other kinds of bread, pastry or dough-based products, having generally circular configuration and being thin, substantially flat disks. Such other products may, for example, by pizza crusts, pie shells and other specialty dough, bread and pastry products.

Especially, however, when large and very expensive equipment is used on a continuing basis for the production of bread such as those generally consumed by persons from or in the Middle East, it is desirable to provide equipment that not only functions properly but is easily serviced and maintained. Moreover, such equipment should not take too much space on the floor of a commercial bakery producing the bread product.

As well, of course, it is always desirable to provide such equipment as spoken of above, as inexpensively as possible.

Very often, particularly in bakeries producing Middle East breads, the preparation and production of the bread comprises mixing the dough with the proper ingredients and preparing it in discrete dough lumps—usually spherical balls—of a specific size and weight. Those dough balls are then passed for a particular period of time through a dough proofer, where they are heated and where the action of the yeast and other constituents within the dough preparation is begun. Thereafter, the lumps or balls of dough are rolled through several sets of rollers so as to become flattened disks, and it is generally the intention that such flattened disks, especially when they are formed from spherical balls of dough, should have generally circular shapes. After the circular disks have been formed, they are then passed to a further proofer, and thereafter to an oven for baking.

Of particular concern is the preparation of the proofed dough to form the flattened disks of generally circular shape. In most cases, the dough is first passed through one or more rollers so as to be rolled to form an ellipse having a particular thickness. That ellipse is permitted to fall onto a moving conveyor belt, by which it is conveyed from the rollers in a first direction. That first conveyor generally extends over a second conveyor which moves at right angles to the first conveyor, and terminates over the second conveyor, so that each rolled ellipse in turn falls from the first conveyor to the second conveyor and moves along the second conveyor in a direction perpendicular to the direction of its first motion and is then introduced to a further set of rollers in a direction such that the axis of rolling the dough is substantially perpendicular to the axis by which the dough had previously been rolled. Thus, a generally circular product is provided from the final set of rollers, because of the fact that an ellipse has been rolled in a direction perpendicular to the major axes of the ellipse.

However, it is evident that such apparatus takes considerable floor space within a bakery. Moreover, the apparatus is such that the flow of dough in the bakery must undergo a 90 degree change of direction in order to be formed with circular shape. Sometimes, it is not convenient that a change of direction of the flow of dough material through the bakery should be accommodated at a particular place, so that very often the working space around the dough flattening rollers becomes quite limited.

Moreover, the use of conveyors and the requisite passage from one conveyor to another of the dough means that the dough is being permitted to cool during the rolling and conveying and handling operations, so that it may be below the temperature at which the best bread product may be baked in the oven. This is, inter alia, because of the fact that a crust may again be formed on the dough.

Still further, the above apparatus as generally found in Middle East bakeries or bakeries producing Middle Eastern types of breads, may be such that the dough is exposed for longer periods of time than absolutely necessary to contaminants which may be in the air.

It is therefore desirable that an apparatus be provided whereby the elliptical shaped dough material after passing one or two sets of rollers should be turned at an angle of 60 to 90 degrees, more or less, so as to pass through yet a further set of rollers where the ellipse is formed into a circular disk of dough material. It is desirable that such apparatus should be as compact as possible, so that the handling time of the dough material within the apparatus is as short as possible, and so that less space within the bakery is occupied by such apparatus.

Still further, it is desirable to provide such apparatus as referred to above, as inexpensively as possible, but where the apparatus is capable of simple maintenance and repair.

Moreover, it is preferable to provide dough shaping apparatus such that the dough being shaped is not generally exposed to the atmosphere. In other words, it is desirable that the dough shaping apparatus should be provided within its own cabinet.

All of the above considerations and features are met by the present invention, which provides an apparatus for shaping lumps of dough to flattened disks, each of which has a substantially circular shape, where the apparatus comprises at least a first pair of rollers which are spaced one from the other, and are substantially cyclindrical driven rollers, having parallel horizontal axes of rotation, and where the width of the nip between that pair of rollers is adjustable. A slideplate is positioned beneath that first-mentioned pair of rollers, and extends downwardly and forwardly from the rearmost of that first pair of rollers, to a position above the rearmost of a second pair of spaced rollers having the same general relationship to each other as the first pair of rollers. A guideway is positioned beneath the rearmost of the second pair of rollers and extends downwardly and forwardly therefrom to a conveyor means.

An opening is provided in the slideplate above the last-mentioned pair of rollers, and a pair of driven conical rollers, one on either side of the slideplate, is provided so that their nip is positioned just slightly forwardly of the opening in the slideplate.

Generally, a second or initial pair of rollers is provided above the first mentioned pair of rollers, and the initial rollers have grooved surfaces for purposes discussed hereafter.

Of course, all of the pairs of rollers are driven towards each other in such a manner that the passage of the dough material as it moves through the respective nips of each succeeding pair of rollers, is downwardly directed.

Clearly, the ellipse of the dough material which passes from the rollers immediately above the conical rollers is caught by the conical rollers and, because of the varying peripheral speed along the surface of the conical rollers, the ellipse of material passing through the nip between the conical rollers is turned on the slideplate through an angle of 60 to 90 degrees, more or less, so that it passes through the final set of rollers in such a manner that it will be formed as a circular flat disk after it leaves the final set of rollers.

Certain prior art shows the use of conical rollers. That prior art includes U.S. Pat. No. 3,019,475, issued to W. G. Smith, on Feb. 6, 1962. That patent shows a stretching apparatus for stretching a continuous web or sheeting of plastic material, for purposes of creating windshields for automobiles.

Two other U.S. patents, each issued to Ford Motor Company, Gurta et al. U.S. Pat. No. 3,885,899 dated May 27, 1975 and Koss et al. U.S. Pat. No. 3,912,440, dated Oct. 14, 1975 teach similar equipment having conical rollers which act on a continuous web of laminated material, also for the production of automobile windshields.

Victor, in U.S. Pat. No. 3,999,926 dated Dec. 28, 1976, provides an apparatus for shaping dough lumps for such purposes as pizza or pie crusts, where the material passes through a first pair of rollers to form an elongated flattened lump which is fed onto a tray which then turns through a 90 degree arc, after which the dough material slides off the tray into the nip of a second pair of rollers from which it immerges having a substantially circular shape.

The purposes of the apparatus of the Victor patent, above, are much the same as the purposes of the apparatus of the present invention. However, that apparatus patent is such that it cannot operate substantially continuously, because it is not possible that a succeeding lump of dough may pass through the first rollers until the rotable tray has regained its first position to receive the rolled dough material and to transfer it to the second set of rollers. Thus, the speed of the Victor equipment may be severely constrained.

Moreover, great care must be taken that the dough material does not rest on or is inadvertently stuck to the transfer tray, thereby slowing down the operation even more because of the necessity for an operator to stop the machine and reach into it and disengage the dough material from the transfer tray.

On the other hand, the other three patents each teach apparatus for stretching web material longitudinally, where it is stretched more at one side than at the other, and the stretching is accomplished by passing the material through the nip of conical rollers.

In contradistinction thereto, the present invention provides a transfer apparatus which has conical rollers, which apparatus may be operated substantially continuously on discrete portions of material to be rolled because there is no necessity to wait for any components of the apparatus to regain an initial starting position, and which possesses all of the other features discussed above.

DESCRIPTION OF THE PREFERRED EMBODIMENTS

Accordingly, the present invention is described in greater detail hereinafter, in association with the accompanying drawings, in which.

DESCRIPTION OF THE PREFERRED EMBODIMENTS

As noted above, it is a principal purpose of the present invention to provide an apparatus for shaping lumps of dough, which are generally spherical, to become flattened disks having substantially circular shape. Such apparatus is indicated generally at 10 in FIGS. 1 and 2, and the same apparatus is referred to diagrammatically in FIG. 3.

As discussed above and described hereafter in greater detail, there are provided various pairs of spaced, driven rollers, through the nips of each of which pairs the dough material will pass.

Thus, there is provided at least a first pair of spaced, substantially cylindrical driven rollers 12, each having a parallel horizontal axis of rotation 14. The width of the nip between the pair of driven rollers 12 is adjustable as indicated at arrow 16 in FIG. 2.

Generally, there is also provided an initial pair of rollers 18, above the rollers 12, the purposes of which are discussed in greater detail hereafter.

Figure 2:
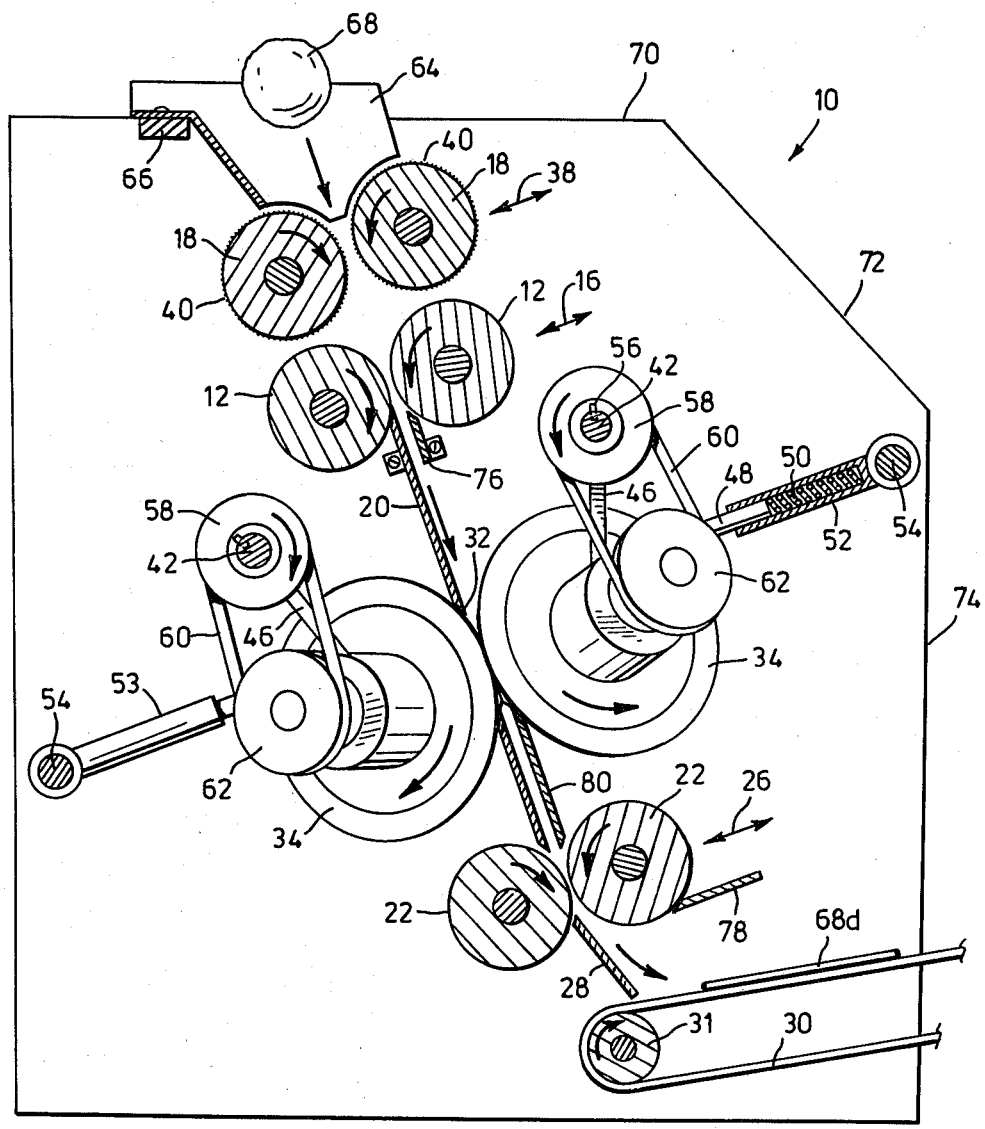
FIG. 2 is a cross-section of the apparatus of FIG. 1, when viewed from the left end thereof.

Beneath the pair of rollers 12 there is located a slideplate 20, positioned as indicated in FIG. 2 beneath the rearmost of the pair of rollers 12, and extending downwardly and forwardly therefrom.

The slideplate 20 extends downwardly to above the rearmost of another pair of spaced, substantially cylindrical driven rollers 22, each having a parallel horizontal axis of rotation 24. As before, the width of the nip between the pair of rollers 22 is adjustable as indicated by arrow 26 in FIG. 2.

A guideway 28 is positioned beneath the rearmost of the pair of rollers 22, and extends downwardly and forwardly therefrom towards a conveyor belt 30. The end of the conveyor belt 30 that is shown, is supported by a roller 31, which may be externally driven, or be an idler roller driven by the conveyor belt 30. The roller 31 has a horizontal axis of rotation 33.

Figure 1:
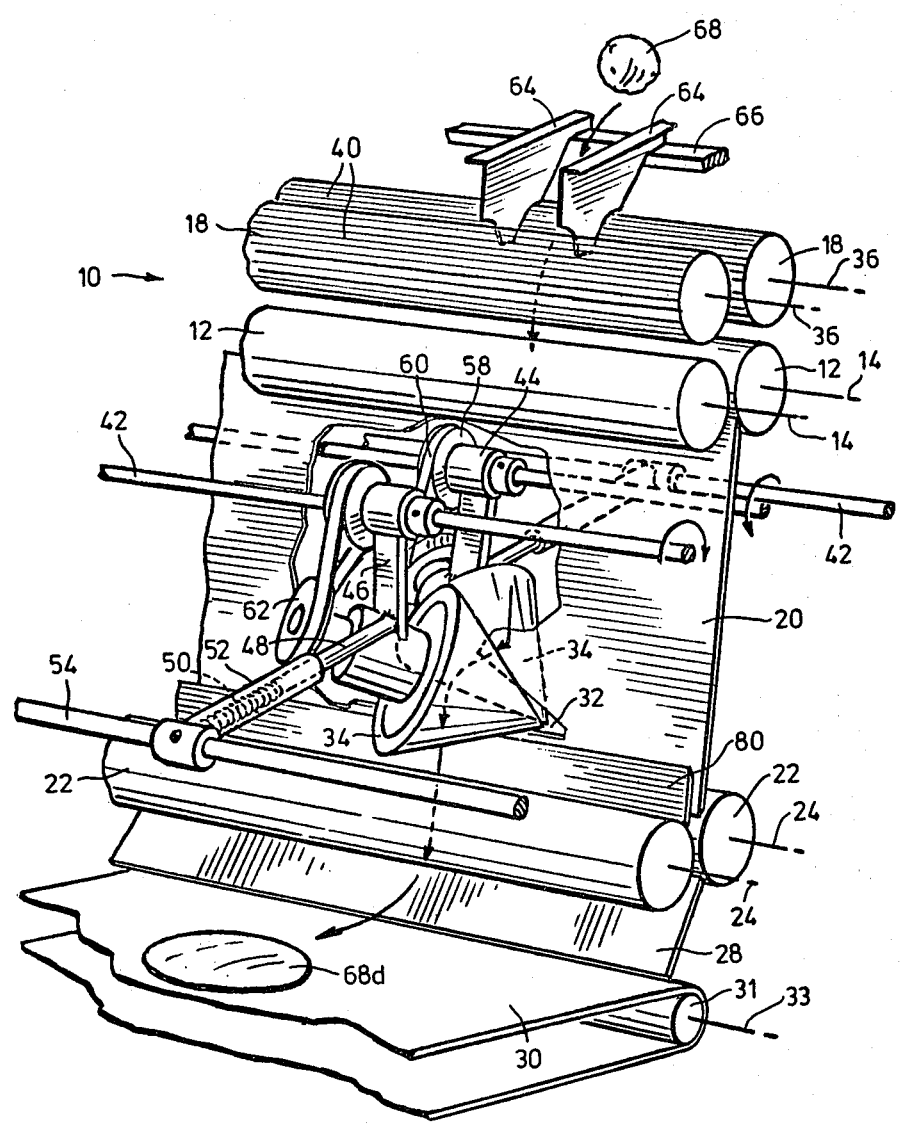
FIG. 1 is a perspective view of the principal components of apparatus according to the present invention.

Within the slideplate 20, there is formed an opening 32, above the pair of rollers 22. A pair of driven conical rollers 34 is provided, one on either side of the slideplate 20, as indicated in FIGS. 1 and 2. The conical rollers 34 are gently urged towards one another as discussed in greater detail hereafter, so that their nip is positioned slightly forwardly of the opening 32 in the slideplate 20.

Of course, all of the pairs of rollers 18, 12, 34 and 22 are adapted for rotation towards each other, in each pair, for downwardly directed passage of the dough material as it moves through the respective nips of each succeeding pair of rollers. The rotation of the rollers is indicated by arrows shown in FIG. 2.

The initial pair of spaced, driven rollers 18, as are provided so that they also have parallel, horizontal axes of rotation 36; and the initial rollers 18 are adjustable as to the width of the nip between them, as indicated by arrow 38 in FIG. 2.

It has been noted that FIG. 2 is a view from the left end of FIG. 1. Moreover, it must be noted that FIG. 1 is a partial view, in that the left end of all of the components of FIG. 1 is noted as being broken—i.e., additional components similar to those illustrated in FIG. 1 may be found to the left of those shown. Indeed, additional components, similar to those shown in FIG. 1, may also be found to the right of those that are shown.

In any event, it is noted that the initial pair of rollers 18 may generally be provided having longitudinal grooves 40 formed in the surfaces of each of the rollers 18. The purpose of the grooves 40 is discussed in greater detail hereafter, when the operation of the apparatus is fully described.

In general, the nip between the conical rollers 34 is at an angle to the horizontal. That angle is generally such that the nip between the tips of the cones which form the conical rollers 34 is lower than the nip between the bases of the cones.

The mounting of the conical rollers 34 is such that each of the conical rollers is swingably suspended from a respective hanging shaft 42, from a bearing 44 on an arm 46. Each of the conical rollers 34 is urged towards the other by a plunger and compression spring assembly, each of which comprises a plunger 48 secured to the conical roller supporting arm 46, acting against a compression spring 50 within a respective socket arm 52. Each socket arm 52 is swingably mounted on a respective anchor shaft 54.

As it happens, it is also convenient that each of the hanging shafts 42 should be a drive shaft, so that keyed thereto as at 56 is a pair of pulleys 58, each of which is associated with a respective V-belt or other driving belt 60, to drive pulleys 62 which comprise part of the mounting assembly for the conical drives 34. Of course, other convenient drive means such as chains or gears may be used.

A set of guideways 64, secured to a suitable support 66, may be provided above the initial pair of rollers 18, with one set of guideways 64 for each pair of conical rollers 34 as discussed hereafter. The respective sets of guideways 64 are substantially vertically in line, within the plane of the slideplate 20, with their respective of conical rollers 34.

As discussed above, generally the dough material to be shaped using apparatus according to this invention is fed through one or more relatively low temperature, oven-like structures that are known as proofers, wherein the chemical reactions necessary for baking the dough are initiated. For producing flattened disks of dough having substantially circular shape, it is best that the starting lumps of dough should be spherical balls. Thus, a spherical ball 68 is provided as indicated in each of FIGS. 1, 2 and 3, and it may conveniently be fed to the initial rollers 18 through a guide trough (not shown), or it may be dropped by hand into the guideways 64. Because there may be a skin developed on the ball of dough 68 in the proofer, the grooves 40 are provided on the initial set of rollers 18 to break up that skin, so as to assure a more even passage of the dough into the next set of rollers 12, and thereafter through the apparatus 10.

It is also to be noted that the apparatus 10 may conveniently be enclosed within a cabinet generally designated at 70, where the front faces 72 and 74 may be lifted for maintenance; but otherwise the apparatus is substantially enclosed so as to reduce any risk of contamination of the dough as it is being rolled.

Figure 3:
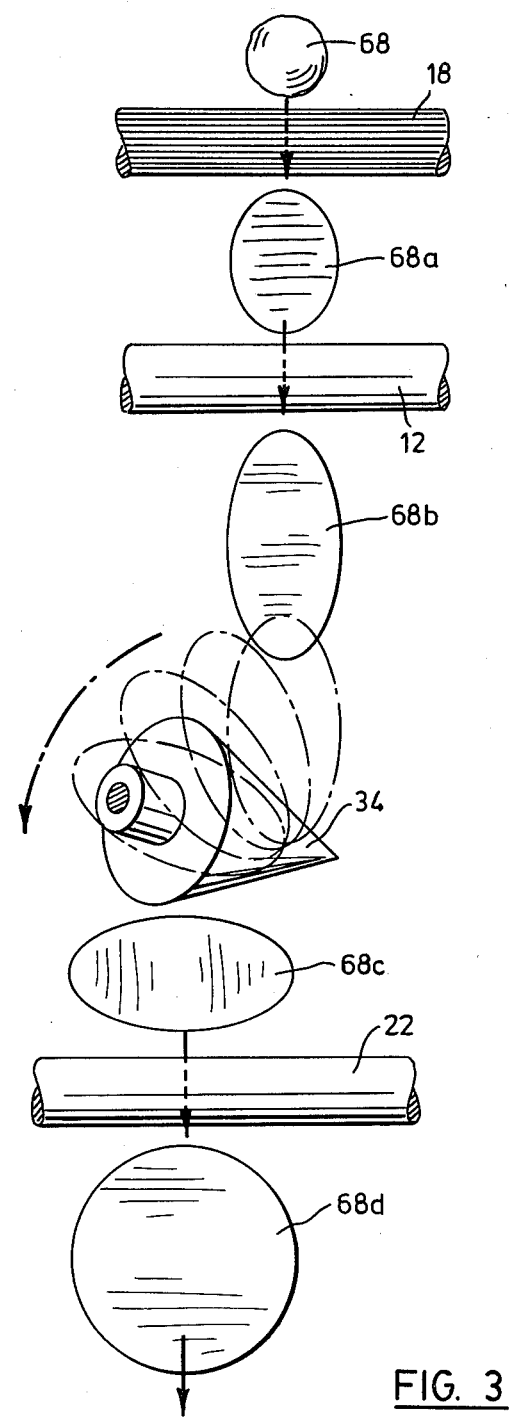
FIG. 3 is a diagrammatic flow diagram showing the production of flattened disks of substantially circular shaped dough material, from initial spherical balls of such material, using apparatus according to the present invention.

Referring specifically to FIG. 3, but with reference to FIGS. 1 and 2 for ease of understanding, it is noted that the ball of dough 68 has changed shape and become somewhat elliptical as at 68a in FIG. 3, and more elliptical as at 68b after it passes through the nip between the rollers 12. The thickness of the dough is not yet at its final thickness—that will occur later. In any event, the ellipse 68b slides down the slideplate 20 and into the nip between the conical rollers 34. Because of the shapes of the conical rollers 34, the ellipse of flattened dough 68b is turned by them, and the amount of turning is dependent upon the included angle of the cones, the rotative speed of the cones 34, and the size of the ellipse 68b. Generally, as previously stated, the nip between the conical rollers 34 is at an angle to the horizontal, which also assists in turning the ellipse 68b for delivery to the next rollers. In any event, there is a turning of the ellipse 68b by the conical rollers 34 because of the faster peripheral speed of the conical rollers as the diameter of the roller increases, so that the ellipse is turned and assumes a position as shown at 68c. Indeed, there may be some additional flattening or rolling of the dough material between the conical rollers 34. Finally, the ellipse 68c passes through the nip of rollers 22, and the dough material becomes circular, as indicated at 68d.

Of course, adjustments are provided for the width of the nip between rollers 18, 12 and 22, and adjustments are provided to change the speed of rotation of the rollers and of the drive shafts 42 and therefore of the conical rollers 34. Thus, for any quantity run of balls of dough 68 having varying weights and therefore intended for production of circular bread having different diameters, a skilled operator can very quickly make the necessary adjustments to the apparatus 10 to provide for the circular shape of the dough as it emerges from between the rollers 22 on to the conveyor 30 for passage to the oven to be baked.

Nonetheless, it is determined that there are certain relationships among the components which provide optimum performance of the apparatus. For example, the angle of the slideplate 20 to the vertical should be from about 10 degrees to about 45 degrees from the vertical. Also, the included angle at the tip or apex of each of the conical rollers 34 should be from about 50 degrees to about 105 degrees, preferably about 75 degrees. Of course, each of the conical rollers in any pair of conical rollers is identical to the other conical roller.

As always, for effective functioning of roller equipment which will handle dough material, most of the rollers—especially the rollers having smooth surfaces—should be provided with scrapers. However, it is most efficient, and less costly, when some scrapers can provide additional functions. Thus, the slideplate 20 also functions as the scraper of the rearmost of the pair of rollers 12, and an additional scraper 76 is provided for the front roller 12. Likewise, the guideway 28 functions as the scraper of the rearmost roller 22, and an additional scraper 78 is provided for the front roller 22.

A set of scrapers may also be provided for the conical rollers 34. Thus, the lower portion of the slideplate 20, below the rearmost conical roller 34, may function as the scraper for that roller; and an additional scraper 80 is provided for the front conical roller 34.

The surfaces of at least the initial pair of rollers 18 and the conical rollers 34, and at least the surfaces of the slideplate 20 and the guideway 28, are each preferably made from or comprise a non-sticking plastics material. For example, the surfaces of the slideplate 20 and guideway 28 may be the same material, and may be a different material than the material from which the conical rollers 34 may have been machined. That material may, in turn, differ from a sleeve which may have been placed over and comprise the surface of the initial rollers 18. In each case, such plastics material may for example by polytetrafluoroethylene, polyethylene, polyurethane, polypropylene, and co-polymers thereof. These plastics materials are representative of but not inclusive of the types and range of suitable plastics materials that may be used.

Finally, it should be noted that the size of each of the pairs of conical rollers 34 which is used in apparatus of the present invention is probably best chosen—depending on the specific circumstances and the product line to be made—to accommodate larger sizes of circular disks of dough having common thicknesses or processes of baking. For example, Middle Eastern bread products may be produced having diameters up to 35 or 40 cm., and as small as 15 cm. If the length of the cones which comprise the conical rollers 34, along the surface, is only 15 or 20 cm., then they cannot function to turn ellipses of dough intended for production of 30 cm. bread products. Larger conical rollers, however, can be used; and in those cases, it is merely required that adjustment of the vertical position of the guideways 64 over the initial rollers 18 be made, and some adjustment may be required as to the operating speeds of the rollers, so that the initial contact of the ellipse of material 68b emerging from the rollers 12 is made with the conicl rollers 34 in such a place and at such a speed that the turning of the material to the position 68c accomplishes the circular shape of the dough material 68d as it emerges from the rollers 22. To do so, it is necessary to turn the ellipse through approximately 90 degrees. A skilled operator may find that the ellipse can be turned through less than 90 degrees but at least 60 degrees, thereby slightly speeding up the operation of the apparatus for a faster throughput of discrete balls of dough 68 in a given period of time.

Suitable, general purpose apparatus has been produced having a peripheral length of the cones which comprise the conical rollers 34 of approximately 25 to 30 cm., with an included angle at the apex of the cone of 75 degrees, and the angle of the nip between the conical rollers 32 to the horizontal being approximately 12 to 15 degrees. The angle of the slideplate 20 to the vertical is approximately 15 to 45 degrees.

Other materials used in the apparatus 10, apart from the plastics materials referred to above or other suitable plastics materials, are generally stainless steel, with plexiglass, polycarbonate, or other clear plastics material as the front faces 72 or 74 to enable an operator to view the continuing operation of the apparatus. The stainless steel, Monel or other metals are of the type generally used for bakery equipment.

In a slightly different embodiment of apparatus according to the present invention, the mounting of the conical rollers 34 may differ from that shown in FIG. 2 to a slight extent. In that further embodiment, the bottom roller—the left most roller as shown in FIG. 2, or the rear roller as shown in FIG. 1—is mounted in a fixed position, so that the arm 53 is of a fixed length and does not have the internally mounted compression spring 50 within it. Likewise, the top conical roller 34—the right most roller in FIG. 2, or the front roller in FIG. 1—is mounted in much the same manner as shown in FIG. 2 except the compression spring 50 is not used. In that case, the top conical roller is urged towards the bottom conical roller by its own weight, swinging as it does on its mounting arm 46. In this embodiment, there is sufficient pressure of the conical rollers one against the other to assure the turning of the dough as it enters the nip between them, without particularly causing very much reduction in the thickness of the dough, because of the weight of the front roller and the force resolution of the weight in the plane of the rotational axes of the conical rollers.

In yet another embodiment of apparatus according to the present invention, the slideplate 20 may be replaced by a conveyor. In that case, the conveyor need not necessarily be at an angle to the vertical, and may be horizontal, while accomplishing the same purposes of conveying dough material which emerges from the pair of rollers 12 and directing it to the nip between the conical rollers 34. The conveyor may, in fact, wrap on the bottom roller 34. Also, a further conveyor or slideplate may then be placed to convey the dough material emerging from the nip of the conical rollers 34 to the final rollers 22.

The above discussion of materials, and illustrations of working apparatus with mention of specific dimensions are, in all events, intended as illustrative and not restrictive to the present invention. Other alterations may be made, as discussed above, or other materials used and dimensions employed, without departing from the spirit and scope of the appended claims.

What is claimed is:

1. Apparatus for shaping lumps of dough to flattened disks, each having a substantially circular shape, comprising:

at least a first pair of spaced, substantially cylindrical driven rollers having parallel horizontal axes of rotation, the width of the nip between said first pair of driven rollers being adjustable;

a slideplate positioned beneath the rearmost of said first pair of rollers and extending downwardly and forwardly therefrom to above the rearmost of a second pair of spaced, substantially cylindrical driven rollers having parallel horizontal axes of rotation, the width of the nip between said second pair of driven rollers being adjustable;

an opening in said slideplate above said second pair of rollers;

a guideway positioned beneath the rearmost of said second pair of rollers and extending downwardly and forwardly therefrom to a conveyor means;

and a pair of driven conical rollers, one on either side of said slideplate, said conical rollers being positioned so that their nip is slightly forward of said opening in said slideplate, and being gently urged towards one another;

all of said pairs of rollers being adapted for rotation towards each other in each pair for downwardly directed passage of the dough material as it moves through the respective nips of succeeding pairs of said rollers.

2. The apparatus of claim 1, wherein said slideplate and guideway function as scrapers for the rearmost of said first and second pairs of rollers, respectively.

3. The apparatus of claim 1, further comprising an additional pair of initial spaced, substantially cylindrical driven rollers having parallel horizontal axes of rotation, the width of the nip between said initial pair of rollers being adjustable; said initial pair of rollers being positioned above said first pair of rollers and adapted for rotation towards each other for downwardly directed passage of said dough material.

4. The apparatus of claim 3, where the surfaces of said initial pair of rollers have longitudinal grooves formed therein.

5. The apparatus of claim 3, where at least the surfaces of at least said initial pair of rollers and said conical rollers, and at least the surfaces of said slideplate and said guideway, are each a non-sticking plastics material.

6. The apparatus of claim 5, where said surfaces are chosen, in each instance, from the group comprising polytetrafluoroethylene, polyethylene, polyurethane, polypropylene, and co-polymers thereof.

7. The apparatus of claim 3, where the nip of said conical rollers is at an angle to the horizontal such that the nip between the apexes of the cones of said rollers is lower than the nip between the base of the cones.

8. The apparatus of claim 7, where said slideplate is positioned at an angle of from 1 degree to 45 degrees from the vertical.

9. The apparatus of claim 7, where the included angle at the apex of each of said conical rollers is from 50 degrees to 105 degrees, and each of said pair of conical rollers is identical to the other of said pair.

10. The apparatus of claim 7, where said conical rollers are each swingably suspended from a respective hanging shaft and are each urged towards the other by a plunger and compression spring means in a respective socket arm swingably mounted on a respective anchor shaft for each said conical roller.

11. The apparatus of claim 10, where said respective hanging shaft for each conical roller is also the drive shaft therefor, and further comprising drive means between said drive shafts and the respective conical rollers.

12. The apparatus of claim 7, where pairs of conical rollers, each pair having a respective opening in said slideplate, are spaced laterally across the width of said apparatus.

13. The apparatus of claim 12, further comprising sets of guideways above said initial pair of rollers, one set of guideways for each pair of conical rollers; where the respective sets of guideways are substantially vertically in line, in the plane of said slideplate, with their respective pairs of conical rollers.

14. Apparatus for shaping lumps of dough to flattened disks, each having a substantially circular shape, comprising:

at least a first pair of spaced, substantially cylindrical driven rollers having parallel horizontal axes of rotation, the width of the nip between said first pair of driven rollers being adjustable;

conveyor means positioned so that dough material issuing from said first pair of rollers is directed to the nip between a pair of driven conical rollers, and further means for conveying dough issuing from between said conical rollers to a second pair of spaced, substantially cylindrical driven rollers having parallel horizontal axes of rotation, the width of the nip between said second pair of driven rollers being adjustable;

said pair of driven conical rollers being gently urged towards one another;

all of said pairs of rollers being adapted for rotation towards each other in each pair so that dough passing through said first pair of cylindrical driven rollers is directed to said conical pair of rollers, and dough passing through said conical pair of rollers is directed towards said second pair of driven cylindrical rollers.

15. The apparatus of claim 14, further comprising an additional pair of initial spaced, substantially cylindrical driven rollers having parallel horizontal axes of rotation, the width of the nip between said initial pair of rollers being adjustable; said initial pair of rollers being adapted for rotation towards each other and being positioned so that dough issuing therefrom is directed towards said first pair of rollers.

16. The apparatus of claim 15, where the surfaces of said initial pair of rollers have longitudinal grooves formed therein.

* * * * *